INVENTOR
W. J. M. JANSEN
BY
Frank R. Jifani
AGENT

March 1, 1966 W. J. M. JANSEN 3,238,006

SOUND FILM REPRODUCING INSTALLATION COMPRISING TWO PROJECTORS EACH HAVING AN OPTICAL SOUND HEAD AND A MAGNETIC SOUND HEAD

Filed Oct. 22, 1962

3 Sheets-Sheet 2

INVENTOR
W. J. M. JANSEN

BY [signature]
AGENT

March 1, 1966 W. J. M. JANSEN 3,238,006

SOUND FILM REPRODUCING INSTALLATION COMPRISING TWO PROJECTORS EACH HAVING AN OPTICAL SOUND HEAD AND A MAGNETIC SOUND HEAD

Filed Oct. 22, 1962

3 Sheets-Sheet 3

INVENTOR.
WILLEM J. M. JANSEN
BY
Frank R. Trifari
AGENT 3,238,006
Patented Mar. 1, 1966

3,238,006

SOUND FILM REPRODUCING INSTALLATION COMPRISING TWO PROJECTORS EACH HAVING AN OPTICAL SOUND HEAD AND A MAGNETIC SOUND HEAD

Willem Johan Maria Jansen, Emmasingel, Eindhoven, Netherlands, assignor to North American Philips Co., Inc., New York, N.Y., a corporation of Delaware Filed Oct. 22, 1962, Ser. No. 232,221
Claims priority, application Netherlands, July 15, 1959, 235,176
3 Claims. (Cl. 352—7)

The present invention is a continuation-in-part of my co-pending U.S. patent application 857,597, filed December 7, 1959, now abandoned.

This invention relates to sound film reproducing installations comprising two projectors each having an optical sound head and a magnetic sound head, which installations permit of reproducing both film with photographic sound tracks and films with magnetic sound tracks. If films of both kinds occur in the same program, then as a rule those provided with a photographic track are led through the optical sound head of one projector and those provided with one or more magnetic tracks are led through the magnetic sound head of the other projector. If it is desired to switch over without interruption from a film of one kind to a film of the other kind, it is necessary for the operator, after the other projector has been made operative, not only to change-over the image-sound commutator at the correct moment, but also to match the amplifying equipment as quickly as possible by means of a commutator to the new condition. This is not satisfactory, since this matching is difficult to perform and may be forgotten.

A principal object of the present invention is to improve this situation and two optical sound heads or each of the two magnetic sound heads are mechanically coupled to a switch which is closed as soon as the relevant sound head has been made operative, these switches being connected through additional contacts of the image-sound commutator of the installation to the switch for changing-over the amplifying equipment of the installation from reproduction of optical sound records to reproduction of magnetic sound records, or conversely.

According to the invention, the said switches may either be closed by the relevant sound heads as soon as the rollers driven by the film, for example, the tension rollers of the latter, exceed a speed corresponding to a certain number of images per second, or are operated by a variation in the positions of the tension rollers of the relevant sound heads.

In order that the invention may be readily carried into effect, one embodiment of an installation according thereto will now be described in detail, by way of example, with reference to the accompanying drawing, in which:

FIG. 1 serves to illustrate the principle of the invention;

Figure 1:
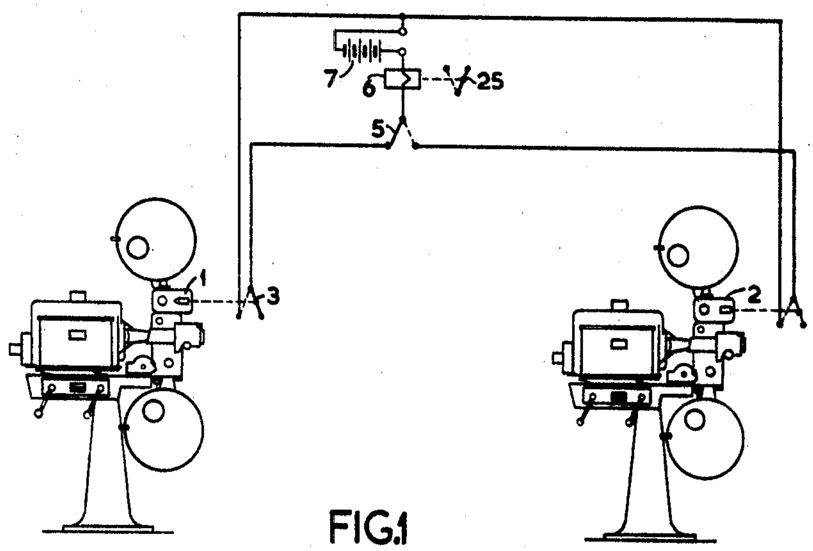

The installation shown in FIG. 1 comprises two projectors A and B, the magnetic sound heads 1 and 2 of which are mechanically connected to switches 3 and 4 respectively, each of which is shown in the open position. The arms of the switches 3 and 4 are connected to the two make contacts of a commutator 5, which forms part of the image-sound commutator by means of which it is possible to change-over from one projector to the other.

The arm of commutator 5 is connected through a relay 6 to one terminal of a source of supply 7, the other terminal of which is connected to the make contacts of the two switches 3 and 4. The relay 6 operates a switch 25 of the amplifying installation (not shown) for changing over from reproduction of optical sound records to reproduction of magnetic sound records. When the said relay is not energized, its switching arm lies on contact O and the amplifier is adjusted to an optical sound track. When the relay is energized, its switching arm lies on contact M and the amplifier is matched to the magnetic sound track.

The switch 3 or 4 is closed only if a film is led under normal operating conditions through the relevant magnetic sound head 1 or 2. The switches may be closed through the film in two manners: either by means of a centrifugal device on the spindle of a roller driven by the film, which device becomes operative when a certain number of revolutions per second is exceeded, or by means of a variation in the position of a tension roller on which the film is laid.

Figure 2:
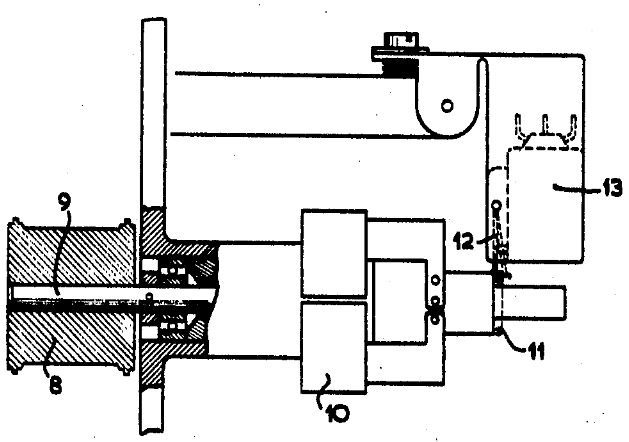
FIGS. 2 and 3 show two different ways in which the switches may be operated by the sound heads.

In FIG. 2, which shows an example of the first-mentioned method, the film is led over a toothed roller 8, the spindle 9 of which carries a centrifugal device 10 which engages, via a collar 11, an arm 12 of a switch 13, thus closing the latter as soon as the number of revolutions of the spindle 9 exceeds a given value.

Figure 3:
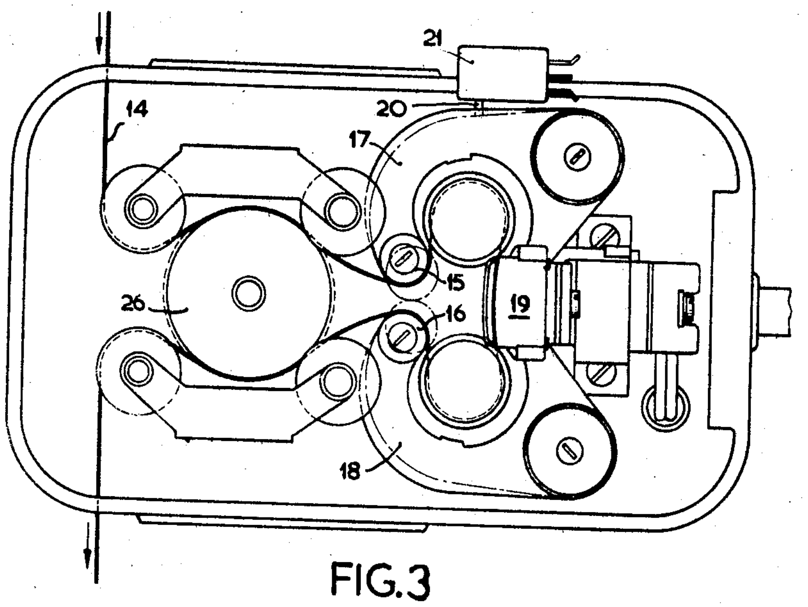

In the embodiment of FIG. 3, which is used for films having a width of 70 mms. the toothed roller indicated by 26 cannot be used for this purpose, since this roller is not driven by the film. The film 14 runs over tension rollers 15, 16, which can rotate about trunnions provided on the extremities of resilient tumblers 17, 18. Between the said tension rollers the film is led over a magnetic head 19. When the tension rollers move apart, such as upon insertion of a film, the tumbler 17 pushes against a resilient arm 20 of a switch 21, which is thus closed. If no film is inserted, the tension rollers engage each other and the switch 21 remains open.

It will be evident that the automatic commutation of the amplifier, which has been described hereinbefore under the control of the magnetic sound heads, may alternatively be effected under the control of the optical sound heads.

Figure 4:
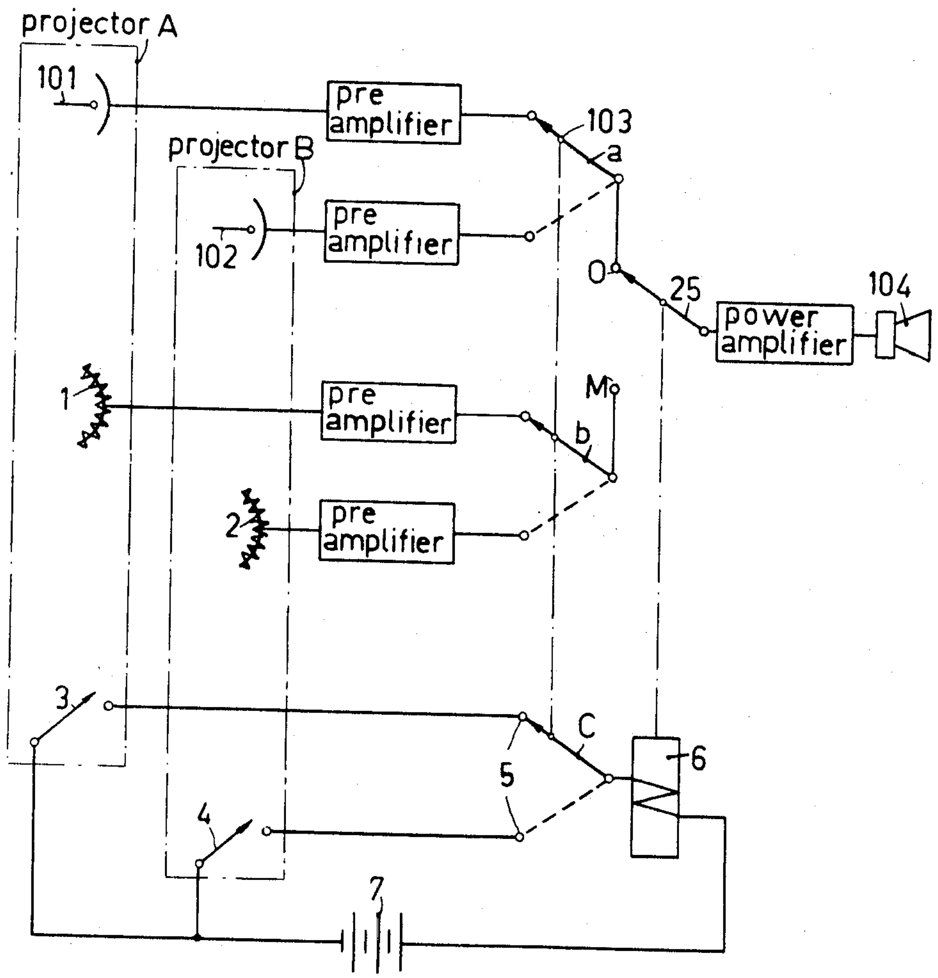
FIG. 4 is a circuit diagram of the invention illustrating the electrical circuit for switching from the sound head of one projector to the sound head of the other projector.

In FIG. 4 the circuit diagram parts which correspond with those of the other figures of the drawings are indicated with like reference numerals.

The description of the circuit diagram given hereinafter reference will be made to projectors A and B. These projectors correspond with the projectors A and B of the illustration shown in FIG. 1 of the drawings.

In the circuit diagram shown in FIG. 4 the reference numerals 1 and 2 indicate magnetic sound heads mounted on projector A and projector B respectively. The reference numerals 101 and 102 indicate optical sound heads also mounted on projector A and projector B respectively. Each of the magnetic sound heads 1 and 2 and the optical sound heads 101 and 102 is connected through a pre-amplifier to an image-sound commutator 103 comprising arms *a*, *b* and *c*. By means of this commutator sound signals coming from projector A (either from magnetic head 1 or optical head 101) or sound signals coming from projector B (either from magnetic head 2 or optical head 102) can be led to a switch 25 having 2 contacts of positions M (magnetic) and O (optical). The switch 25 is connected through a power amplifier to a loudspeaker system 104.

Switch 25 is operated by relay 6 which can be placed by means of arm *c* of the commutator 103 in either of two circuits defined by contacts 5, the first of said circuits comprising a current supply 7, the relay 6, the arm *c* and a switch 3; the second of said circuits comprising said current supply 7, the relay 6, the arm *c* and a switch 4

Said switches 3 and 4 are mounted on projector A and B respectively and can be operated by the film to be projected if said film runs and is led over magnetic head 1 or 2.

The circuit diagram described hereinbefore will now be elucidated by means of an example of conditions which may occur in practice.

Assuming that for the same film performance successively, without any interruption, two films will have to be reproduced and assuming that one of these films is provided with photographed sound track and the other is provided with magnetic sound track, the first film I is led through the optical sound head 101 of projector A and the second film II is led through the magnetic sound head 2 of projector B. So film I is not in contact with the magnetic head 1 of the projector A and the film II is not in contact with the optical sound 102 of projector B. At the end of reproducing film I, projector B is started in order to get images and sound from this projector. Starting projector B is done by means of commutator 103 which for this purpose is provided with additional switches not showing in the circuit diagram and forming no part of the invention. As projector B is provided with an optical sound head as well as a magnetic sound head sound may come either from one of these heads. In the example given film II is led only through magnetic head 2. Consequently signals come only from this magnetic head. Projector A, however, delivered sound signals coming from optical head 101 and for this reason the amplifier device which is the same for the projectors A and B, was switched in by means of switch 25 in position O for amplifying signals derived from an optical head i.e. the head 101. As projector B delivers signals derived from magnetic head 2 provisions have been made also to move switch 25 from position O to position M in order to change to another pre-amplifier device and to switch the apparatus over to projector B for amplifying magnetic signals.

The switching of switch 25 is established automatically. When commutator 103 is operated arm *c* of commutator 103 is moved into its position showing in dotted lines in FIG. 4. Film II on projector B starts to run and switch 4 is closed. Consequently relay 6 will be energized and switch 25 will be brought in its position M.

It will be readily understood that if projector B is not loaded with film provided with magnetic sound track but with film provided with an optical sound track, said last mentioned film will be led through optical sound head 102 of projector B. Consequently, switch 4 will then remain open after commutator 103 will have been operated so that relay 6 is not energized and switch 25 remain in its position O.

The description given of the circuit diagram is based on the fact that the switches 3 and 4 are only operated by the film if said film runs through the magnetic heads 1 or 2 respectively. According to a modification it is also possible to have the switches 3 and 4 operated only by the film if said film runs through the optical heads. Such modification will also lie within the scope of the present invention as defined in the claims.

What is claimed is:

1. A sound film reproducing apparatus comprising: an amplifying system including two projectors, each having an optical sound head and a magnetic sound head, a circuit comprising a switch at each projector being mechanically and selectively connected to one of said sound heads, said switches being closed by said film, an image-sound commutator, a relay operatively connected to said image-sound commutator, a current supply for said relay, and a switch for said amplifying system whereby when said image-sound commutator connects one of said projector switches to said relay, the latter operates the switch of said amplifying system for changing over the amplifying system from optical to magnetic sound heads and vice versa.

2. A sound film reproducing apparatus comprising: an amplifying system including two projectors, each having an optical sound head and a magnetic sound head, a circuit comprising a switch at each projector being mechanically and selectively connected to one of said sound heads, said switches being closed by said film, said sound heads being provided with rollers which are driven by the film, each of said switches being closed by a selected sound head when the speed of the rollers exceeds a predetermined speed corresponding to a given number of images per second, an image-sound commutator, a relay operatively connected to said image-sound commutator, a current supply for said relay, and a switch for said amplifying system whereby when said image-sound commutator connects one of said projector switches to said relay, the latter operates the switch of said amplifying system for changing over the amplifying system from optical to magnetic sound heads and vice versa.

3. A sound film reproducing apparatus comprising: an amplifying system including two projectors, each having an optical sound head and a magnetic sound head, a circuit comprising a switch at each projector being mechanically and selectively connected to one of said sound heads, said switches being closed by said film, each of said switches being closed when a predetermined sound head is operated, tension rollers for the sound heads, said switches being operated by the variation in positions of the tension roller of the predetermined sound head, said sound heads being provided with rollers which are driven by the film, an image-sound commutator, a relay operatively connected to said image-sound commutator, a current supply for said relay, and a switch for said amplifying system whereby when said image-sound commutator connects one of said projector switches to said relay, the latter operates the switch of said amplifying system for changing over the amplifying system from optical to magnetic sound heads and vice versa.

References Cited by the Examiner

UNITED STATES PATENTS

| | | | |
|---|---|---|---|
| 1,700,833 | 2/1929 | Engel | 179—100.3 |
| 1,796,970 | 3/1931 | Strong | 352—7 |
| 1,960,817 | 5/1934 | Kemp et al. | 352—135 |
| 1,990,388 | 2/1935 | Lootens | 179—100.3 |
| 2,676,023 | 4/1954 | Isom | 352—29 X |
| 2,756,277 | 7/1956 | Good et al. | 179—100.2 |
| 2,768,242 | 10/1956 | Weber | 179—100.1 |

EVON C. BLUNK, *Primary Examiner.*

WILLIAM MISIEK, NORTON ANSHER, *Examiners.*